United States Patent
Kowald et al.

(10) Patent No.: US 10,664,136 B2
(45) Date of Patent: May 26, 2020

(54) METHOD, SYSTEM AND APPARATUS FOR SELECTING ITEMS IN A GRAPHICAL USER INTERFACE

(71) Applicant: CANON KABUSHIKI KAISHA, Tokyo (JP)

(72) Inventors: Julie Rae Kowald, Dundas Valley (AU); Evgeny Vostrikov, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/210,642

(22) Filed: Dec. 5, 2018

(65) Prior Publication Data

US 2019/0187866 A1    Jun. 20, 2019

(30) Foreign Application Priority Data

Dec. 14, 2017 (AU) ................ 2017276290

(51) Int. Cl.
*G06F 3/0482* (2013.01)
*G06F 3/0488* (2013.01)
*G06F 3/0484* (2013.01)
*G01C 21/36* (2006.01)

(52) U.S. Cl.
CPC .......... *G06F 3/0482* (2013.01); *G06F 3/0488* (2013.01); *G06F 3/04842* (2013.01); *G01C 21/367* (2013.01)

(58) Field of Classification Search
CPC ...... G06F 3/0482; G06F 3/0488; G06F 3/048; G06T 15/00; G06T 17/00; G06T 11/20; G06T 7/0083
See application file for complete search history.

(56) References Cited

U.S. PATENT DOCUMENTS

| | | | |
|---|---|---|---|
| 6,295,049 B1 | 9/2001 | Minner | |
| 8,339,394 B1 * | 12/2012 | Lininger | G06T 15/04 345/419 |
| 8,726,194 B2 | 5/2014 | Hildreth | |
| 8,799,799 B1 | 8/2014 | Cervelli et al. | |
| 9,080,885 B2 | 7/2015 | Kocienda | |
| 9,224,218 B2 | 12/2015 | Pahwa et al. | |
| 9,250,730 B2 | 2/2016 | Au et al. | |
| 9,292,195 B2 | 3/2016 | Fleizach et al. | |
| 9,299,168 B2 | 3/2016 | Ubillos et al. | |
| 2010/0001953 A1 | 1/2010 | Yamamoto et al. | |
| 2010/0241973 A1 | 9/2010 | Whiddett | |
| 2012/0200572 A1 * | 8/2012 | Kaechi | G06F 3/04845 345/442 |

(Continued)

*Primary Examiner* — Rashawn N Tillery
(74) *Attorney, Agent, or Firm* — Canon U.S.A., Inc. IP Division

(57) ABSTRACT

A method of selecting items in a graphical user interface displayed on a screen. A selection of at least one item in the graphical user interface is detected, the at least one item being located in a bounded region of the graphical user interface, the bounded region having an abutting region. In the abutting region, a selection deadband representing a distance from a boundary between the bounded region and the abutting region is set, the selection deadband having a thickness determined according to proximity of another boundary of the abutting region. Selection of an item located in the abutting region is disabled until a selector is traversed past the selection deadband and into the abutting region.

14 Claims, 10 Drawing Sheets

(56) References Cited

U.S. PATENT DOCUMENTS

| | | | |
|---|---|---|---|
| 2015/0375548 A1* | 12/2015 | Yamasaki | B41J 29/38 |
| | | | 347/5 |
| 2016/0093060 A1* | 3/2016 | Rivet-Sabourin | G06T 3/4053 |
| | | | 382/128 |
| 2017/0199620 A1* | 7/2017 | Ishitsuka | H04N 5/23216 |

* cited by examiner

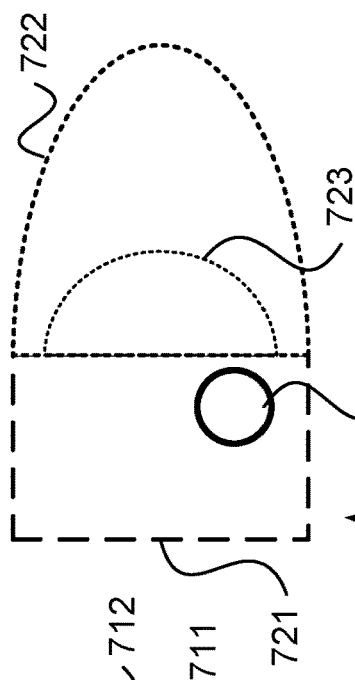
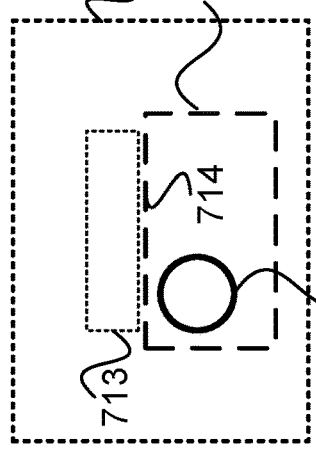
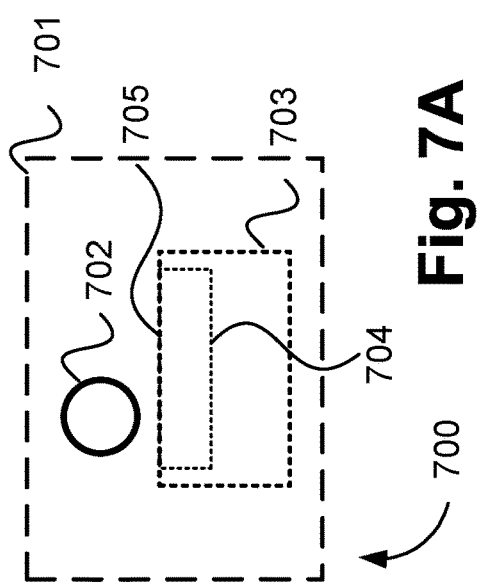
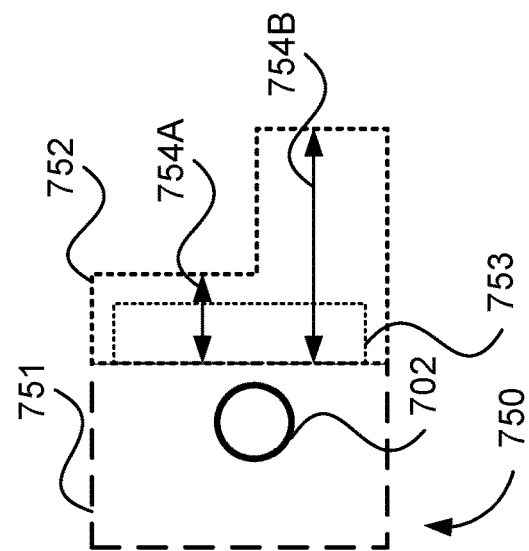
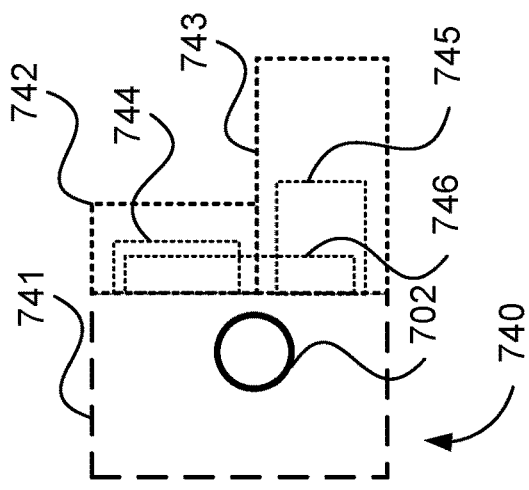
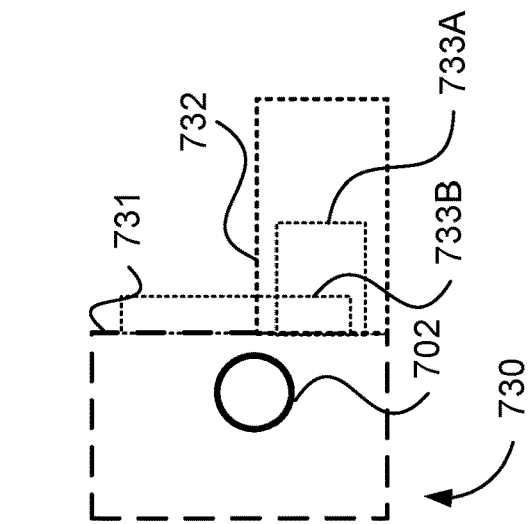

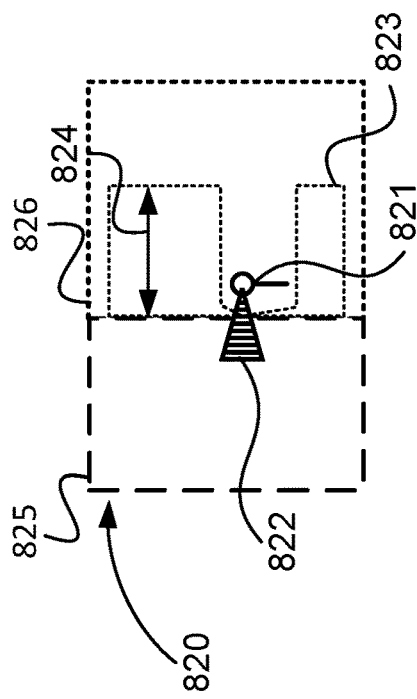
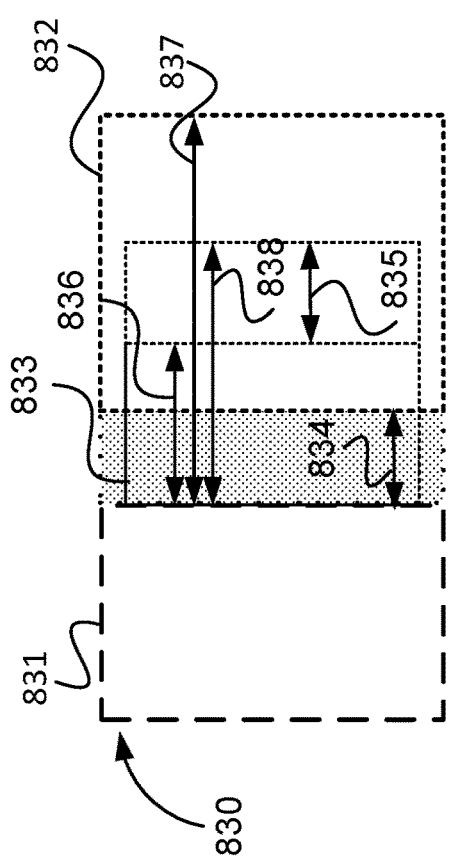
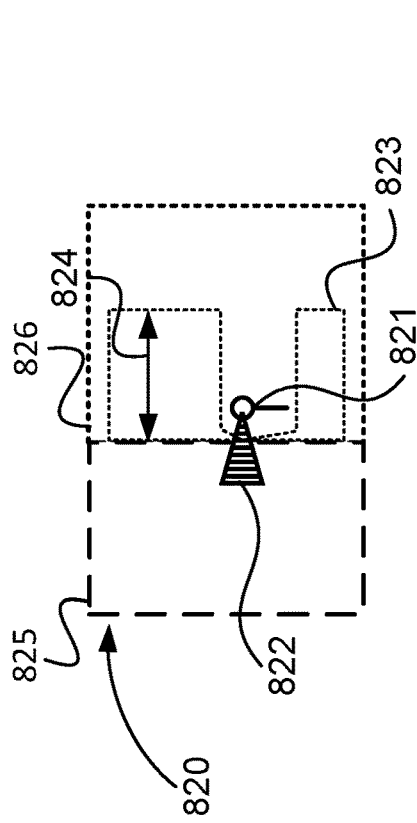
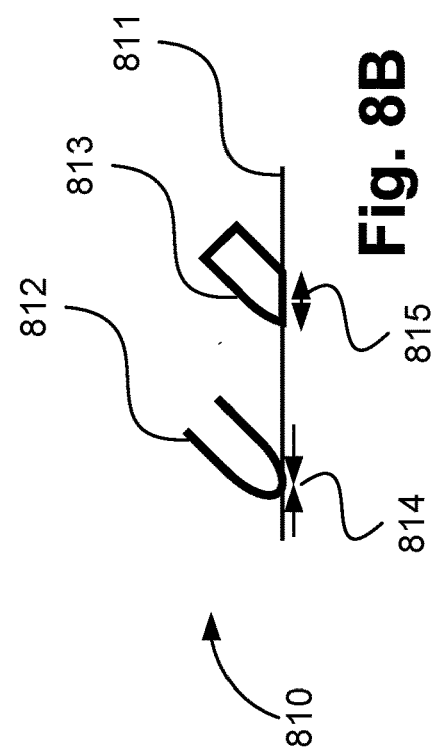

METHOD, SYSTEM AND APPARATUS FOR SELECTING ITEMS IN A GRAPHICAL USER INTERFACE

REFERENCE TO RELATED PATENT APPLICATION(S)

This application claims the benefit under 35 U.S.C. § 119 of the filing date of Australian Patent Application No. 2017276290, filed 14 Dec. 2017, hereby incorporated by reference in its entirety as if fully set forth herein.

TECHNICAL FIELD

The present invention relates to spatial data management and display and, in particular, to a method, system and apparatus for selecting items in a graphical user interface. The present invention also relates to a computer program product including a computer readable medium having recorded thereon a computer program for selecting items in a graphical user interface.

BACKGROUND

Using a digital mapping service, adorned with location markers (or pins), is known. Location markers are often used by online services such as Google Maps to illustrate a map with pins that indicate locations of importance to users, such as locations of shops and other points of interest. Other digital mapping services also allow the display and selection of a region of a map, such as a suburb or locality within a city; to display information about the selected regions. Users, however, have been constrained to selecting a single location at a time (by selecting a pin), or by selecting a whole region at a time (and thus any pins within).

Unfortunately, existing methods of allowing the selection of location markers that are located in adjacent regions have often not considered the difficulties in performing these selections when there is a high density of location markers that are near the boundary between regions. Existing methods typically require the users to zoom in until it is clear to which region a location marker belongs and the user may then select their desired location marker. This results in a negative user experience when the user would like to select the location markers near the boundary of a region in a continuous selection mode, as the user needs to zoom-in to select. However, the user then cannot see everything and needs to zoom-out or pan to move the map to a next part of the region in which the user wishes to select location markers.

Unfortunately, the existing methods of allowing the selection of location markers that are located in abutting regions do not support an easy method of extending the number of adjacent regions from which a location marker may be selected. One existing method allows the user to select multiple regions on an image and then to limit image operations to the selected regions. However, the selection of the multiple regions is manual and tedious since the user has to select an additional region where location markers may be selected.

In another one existing method, a region of interest is considered after an initial location marker is selected. Other location markers within the region of interest are then ordered into a sequence of location markers that are selected as a selection cursor moves in a direction. In such an arrangement, a dense location marker case is considered by creating a sequence of the location markers. However, the selection of location markers is limited to within items in a single region. Further, an additional region is still not able to be easily considered, and location markers near a boundary of the region are not able to be selected.

SUMMARY

It is an object of the present invention to substantially overcome, or at least ameliorate, one or more disadvantages of existing arrangements.

Disclosed are arrangements which determine a selection deadband to provide a user with fine selection control of location pins, thus assisting the user to avoid selection of unwanted point data. The selection deadband varies according to factors including the proximity of another boundary to the boundary of a current set and position of related location pins outside the boundary.

According to one aspect of the present disclosure, there is provided a method of selecting items in a graphical user interface displayed on a screen, the method comprising:

detecting a selection of at least one item in the graphical user interface, the at least one item being located in a bounded region of the graphical user interface, the bounded region having an abutting region;

setting, in the abutting region, a selection deadband representing a distance from a boundary between the bounded region and the abutting region, the selection deadband having a thickness determined according to proximity of another boundary of the abutting region; and disabling selection of an item located in the abutting region until a selector is traversed past the selection deadband and into the abutting region.

According to another aspect of the present disclosure, there is provided an apparatus for selecting items in a graphical user interface displayed on a screen, the apparatus comprising:

means for detecting a selection of at least one item in the graphical user interface, the at least one item being located in a bounded region of the graphical user interface, the bounded region having an abutting region;

means for setting, in the abutting region, a selection deadband representing a distance from a boundary between the bounded region and the abutting region, the selection deadband having a thickness determined according to proximity of another boundary of the abutting region; and means for disabling selection of an item located in the abutting region until a selector is traversed past the selection deadband and into the abutting region.

According to still another aspect of the present disclosure, there is provided a system for selecting items in a graphical user interface displayed on a screen, the system comprising:

a memory for storing data and a computer program;

a processor coupled to the memory for executing the computer program, the computer program having instructions for:

detecting a selection of at least one item in the graphical user interface, the at least one item being located in a bounded region of the graphical user interface, the bounded region having an abutting region;

setting, in the abutting region, a selection deadband representing a distance from a boundary between the bounded region and the abutting region, the selection deadband having a thickness determined according to proximity of another boundary of the abutting region; and disabling selection of an item located in the abutting region until a selector is traversed past the selection deadband and into the abutting region.

According to still another aspect of the present disclosure, there is provided a non-transitory computer readable medium having a program stored on the medium for selecting items in a graphical user interface displayed on a screen, the program comprising:

code for detecting a selection of at least one item in the graphical user interface, the at least one item being located in a bounded region of the graphical user interface, the bounded region having an abutting region;

code for setting, in the abutting region, a selection deadband representing a distance from a boundary between the bounded region and the abutting region, the selection deadband having a thickness determined according to proximity of another boundary of the abutting region; and code for disabling selection of an item located in the abutting region until a selector is traversed past the selection deadband and into the abutting region.

Other aspects are also disclosed.

BRIEF DESCRIPTION OF THE DRAWINGS

One or more embodiments of the invention will now be described with reference to the following drawings, in which:

FIG. 7A shows an initial region with a cursor located within the initial region;

FIG. 7B shows an initial region with a cursor located within an initial region of another map;

FIG. 7C shows an initial region with a cursor located within the region of another map;

FIG. 7D shows another map comprising an initial region with an abutting region having a eight that is smaller than the initial region;

FIG. 7E shows another map comprising an initial region with a top-abutting-region and bottom abutting region;

FIG. 7F shows another map comprising an initial region with an L shaped abutting region;

FIG. 8A shows a finger patch of a diameter in an initial region of a map instead of a cursor in the initial region;

FIG. 8B shows a touch-surface that is able to sense the tap of a finger by either detecting conductivity or by detecting pressure;

FIG. 8C shows an item 821 containing orientation information;

FIG. 8D shows an example where the thickness of the selection-deadband has to be increased by an extension;

DETAILED DESCRIPTION INCLUDING BEST MODE

Figure 1A:
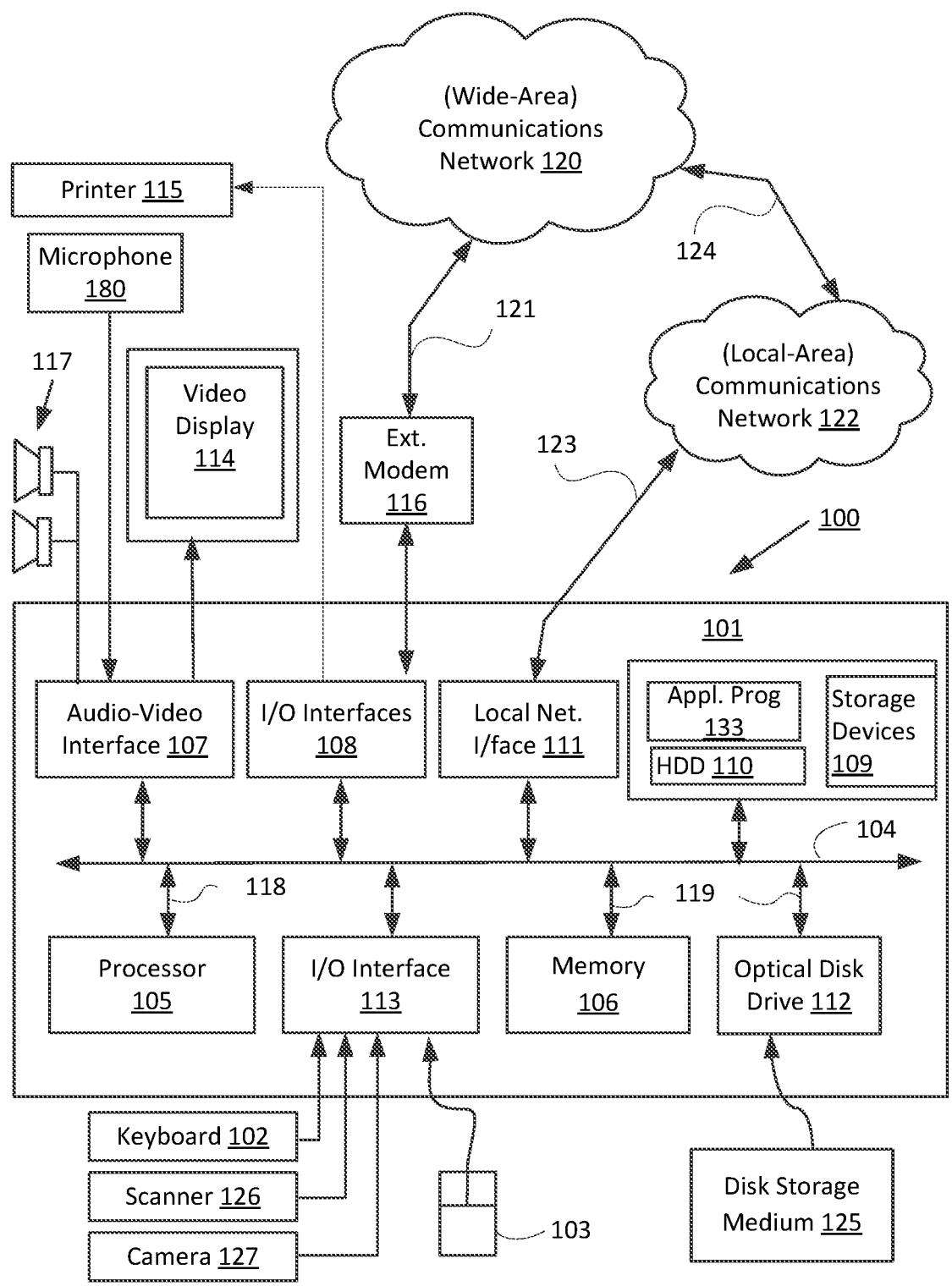
FIGS. 1A and 1B form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Figure 3:
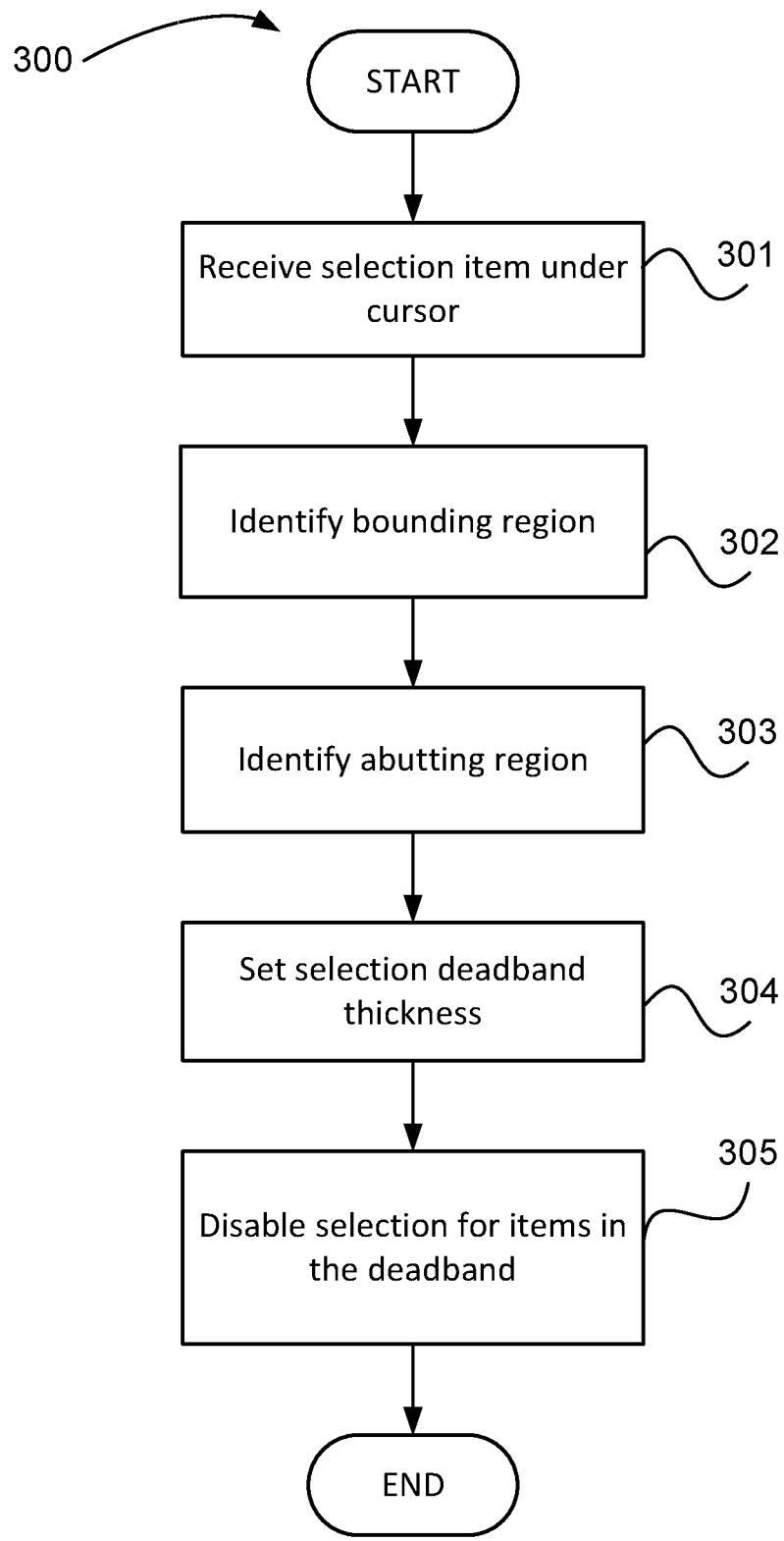
FIG. 3 is a flow diagram showing a method of selecting items in a graphical user interface displayed on a display screen.

A method 300 of selecting items in a graphical user interface displayed on a display screen, will be described below with reference to FIG. 3. The described method 300 may be practiced on a farm where crops are grown. A crop farm is typically divided into blocks, each which grow a different type of crop. The blocks are typically arranged as large rectangles but can also be non-regular in shape due to terrain or other factors. A vineyard is a type of farm that grows a crop of grapes. The employees of a vineyard have, amongst their duties, a need to regularly inspect the grapes and vines to ensure a healthy and bountiful harvest is forthcoming.

To assist in the inspection duties, the vineyard employees may take with them a camera to capture photographs to document their observations, actions, doubts, etc. Metadata may be stored in each photograph captured by the camera, including location information (GPS), orientation information (Compass bearing), and other aspects of the camera.

The vineyard employees may use an application implementing the described methods to facilitate their use of the photographs captured as part of their above inspection duties. One of the functions of the mentioned application is to practice the described methods.

Figure 1B:
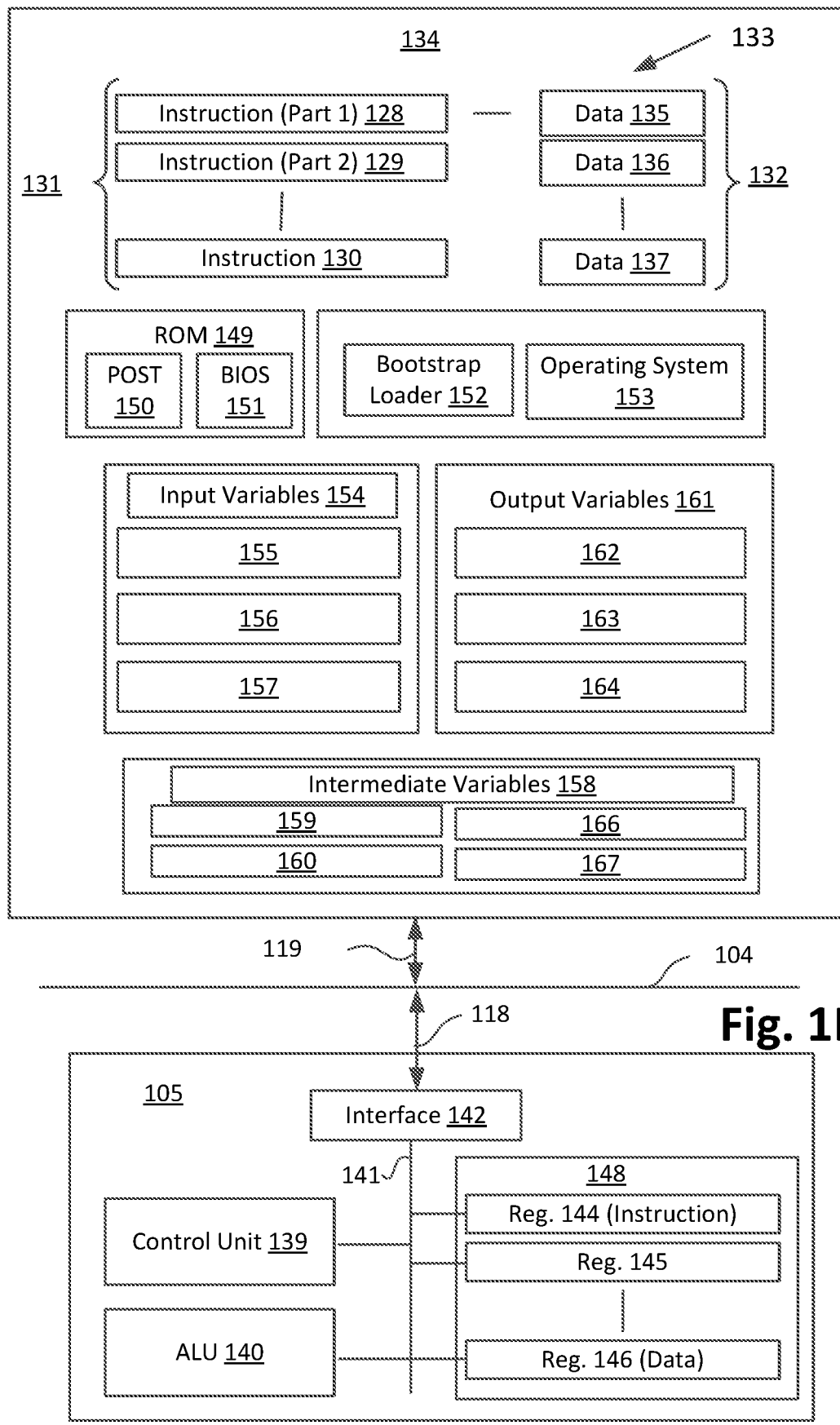

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

The selection method 300 and other methods described below may be implemented using the computer system 100 wherein the processes of FIGS. 3 to 9B, to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfill various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3 to 9B is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
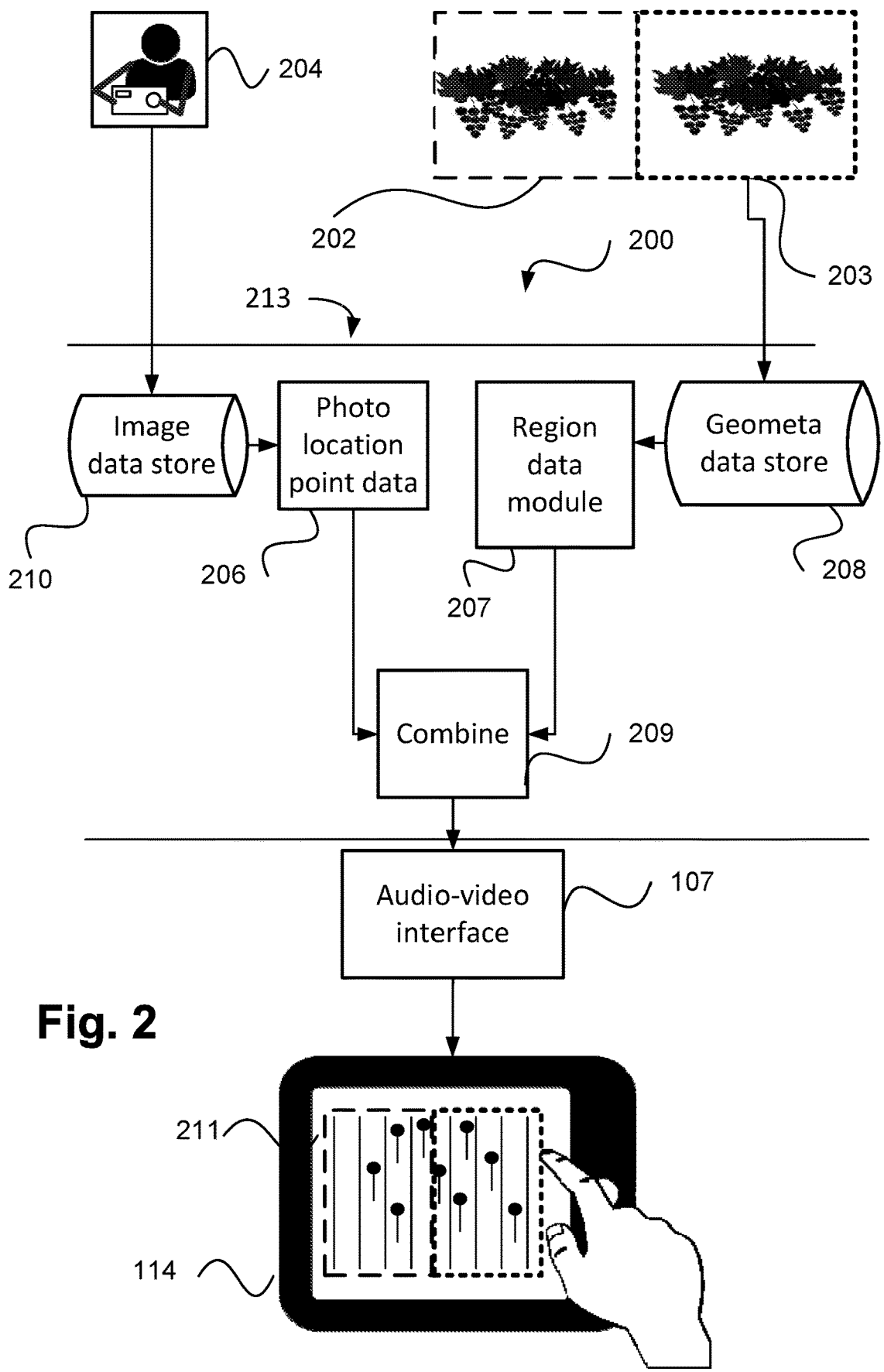
FIG. 2 shows a software architecture for implementing the described arrangements.

FIG. 2 shows a software architecture 200 for implementing the selection methods. As seen in FIG. 2, a photographer 204 captures photographs of grape vines of a first variety 202, a second variety 203, and of many more varieties too. The images of the first and second varieties 202 and 203 captured by the photographer 204 are stored in a geospatial system 213. The system 213 may be implemented as one or more software code modules of the software application program 113 stored within the hard disk drive 110 and being controlled its execution by the processor 105.

The geospatial system 213 comprises an image store 210, where the images captured by the photographer 204 are stored. A photo location point data module 206 is configured to extract location information from the photos stored in the image data store 210. The system 213 also comprises a geometa data store 208 that stores information about the varieties, such as the type of grape variety 202/203, block information of the vineyard (including boundaries), terrain and landscape information. The geospatial system 213 also comprises a region data module 207 which is configured to extract information out of the geometa data store 208 such as the region that a block covers. The geospatial system 213 also comprises a combination module 209. The module 209 is configured to combine location information from individual images and variety regions to provide data to the audio-video interface 107. The audio-video interface 107 renders the received data for display on a user interface 211 displayed on the display 114. The interface 107 may also prepare for display, in addition to the location of images and block boundaries other items such as infrastructure locations, weather information or annotations made by the vineyard workers. The user interface 211 is then able to display (e.g., on a touch-screen surface) a map containing an outline of the block regions, with the images and annotations as location markers (pins) on the map. The user may select a pin belonging to a photo to view or select the photo.

The selection system assists the user in selecting the pins on the map according to the region that they are located.

The user interface 211 as shown in FIG. 2 displays multiple items on the map, such as pins and boundaries. The pins represent locations of items with GPS data and the boundaries. The boundaries may be either naturally occurring geographical boundaries, or artificial boundaries preconfigured, or automatically determined. The user interface 211 is operable by a selector in the form of a screen cursor. The screen cursor may sometimes be controlled by a pointing device such as mouse 103, or perhaps with directional keys on the keyboard 102, or even with a touchscreen allowing finger tactile input.

The method 300 of selecting items in a graphical user interface displayed on a display screen, will now be described with reference to FIG. 3. The method 300 solves the problem where selecting items near a boundary may result in accidental selection of items outside of a desired region that the boundary bounds. The method 300 will be described by way of example with reference to the user interface 211 displayed on the display 114. The method 300 may be implemented as one or more software code modules of the software application program 133 resident in the hard disk drive 110 and being controlled in its execution by the processor 105.

The method 300 begins at receiving step 301, where a selection item is received under the cursor. The selection item is received under execution of the processor 105. The selection item is an item containing location information that is displayed on the map typically represented by a haberdashery pin (or other icon). Examples of items containing location information are images with recorded location data, map-annotations manually or automatically created by the user interface 211 or through other means.

The method 300 continues at identifying step 302, where the bounding region of the selection item is identified under execution of the processor 105. The bounding region of the selection item is identified by querying the region data module 207 with the location for the item, extracting bounding region information. Then, at identifying step 303, abutting regions to the bounding region identified at 302 are identified under execution of the processor 105. The abutting regions to the bounding region are identified at step 303 by querying the region data module 207. Then, the method 300 sets a selection-deadband thickness at setting step 304. The method 300 concludes at disabling step 305, where selection for items in the selection-deadband is disabled.

According to the method 300, any items located in the selection-deadband cannot be selected until the selector in the form of the cursor has traversed from the bounding region identified at step 302, past the selection-deadband and into an abutting region. Selection of an item located within the abutting region is disabled until the cursor is traversed past the selection deadband and into the abutting region.

Figure 4:
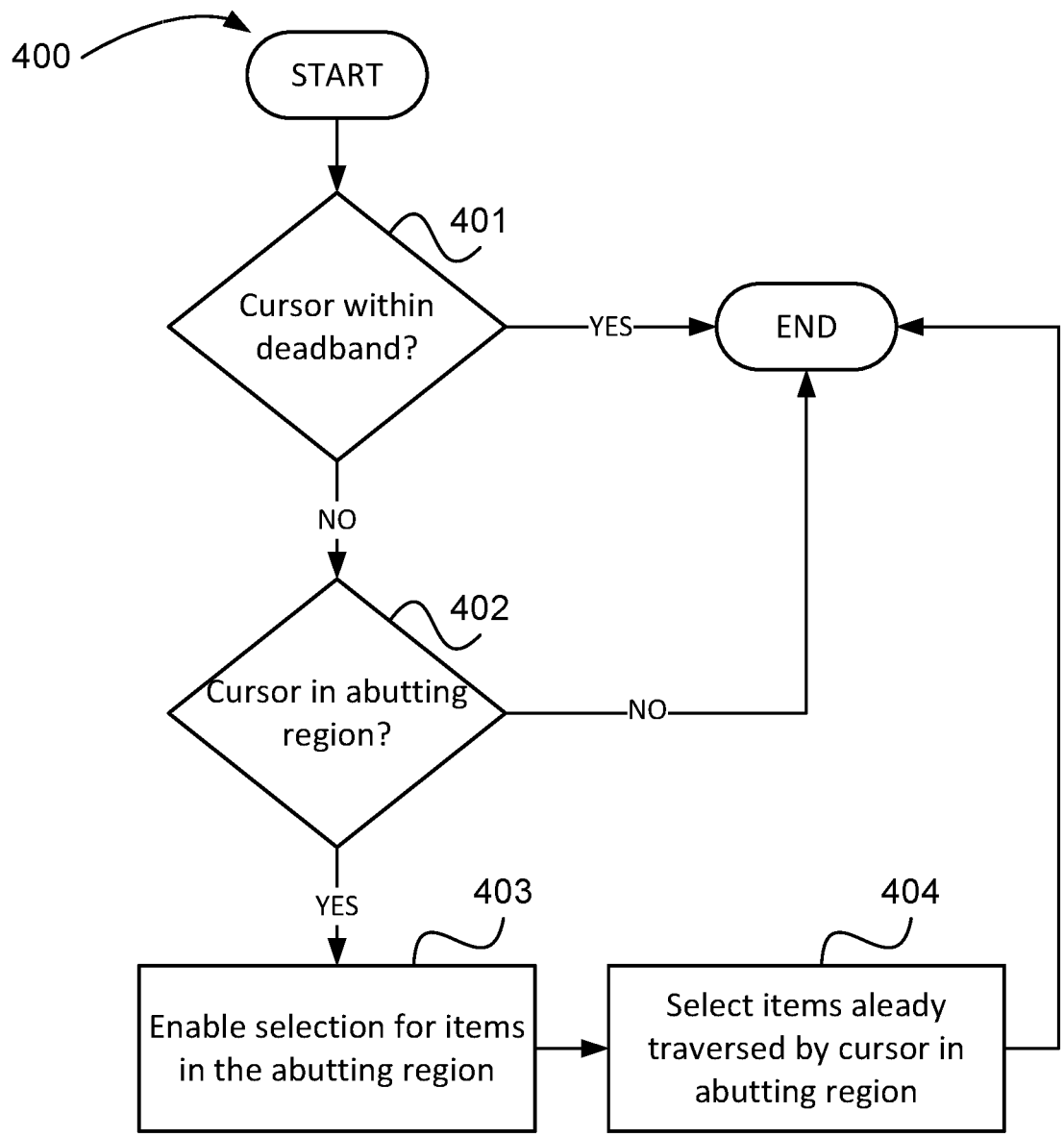
FIG. 4 shows a process flowchart that executes an aspect of the selection system.

A method 400 for enabling selection of items in an abutting region, will now be described in detail below with reference to FIG. 4. The method 400 may be implemented as one or more software code modules of the software application program 133 resident in the hard disk drive 110 and being controlled in its execution by the processor 105.

The method 400 begins at decision step 401, where if the current location of a cursor displayed on the user interface 211 is within the selection-deadband determined at step 304, then the method 400 concludes. If the cursor is within the selection-deadband then items in the selection-deadband cannot be selected.

Otherwise, if the cursor is not within the selection-deadband, then the method 400 proceeds to decision step 402. At step 402, if the cursor is within the abutting region, then the method 400 proceeds to enabling step 403. Otherwise, if the cursor is not within the abutting region then the method 400 concludes and the items in the selection-deadband cannot be selected.

At enabling step 403, the items in the selection-deadband region are enabled for selection and can now be selected. The method 400 proceeds from step 403 to selecting step 404, the items in the graphical user interface that have already had the cursor travel through (or over) the items are selected under execution of the processor 105.

Thus, by introducing a selection-deadband contained outside of the boundary region of the selected item, a user operating the user interface 211 may be assisted to limit initial and subsequent selections within the region. The methods 300 and 400 reduce user fatigue especially when attempting to select an item that is very close to another item in the abutting region.

The methods 300 and 400 shall now be further described by way of example with reference to FIGS. 5A, 5B, 5C and 5D. The methods 300 and 400 will also be further described with reference to FIGS. 6A, 6B, FIGS. 7A, 7B, 7C, 7D and 7E.

Figure 5A:
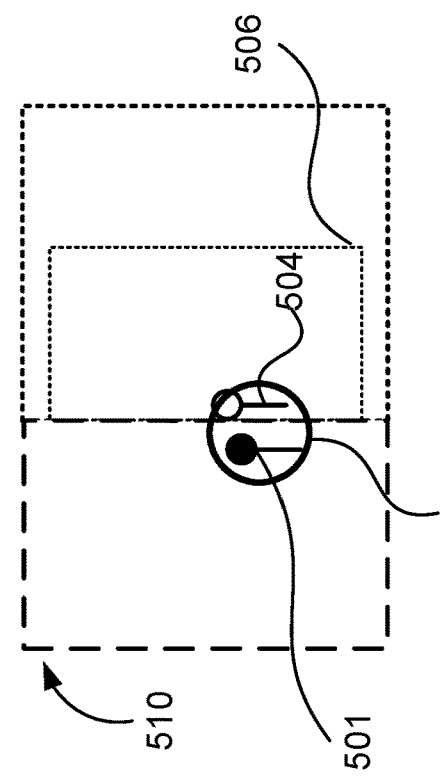
FIG. 5A shows a map containing a selection item under a cursor and a non-selected item.

FIG. 5A shows a map 500 containing a selection item 501 under cursor 502. A non-selected item 504 is also shown in FIG. 5. According to step 302 of the method 300, the selected item 501 is identified to belong to bounded region 503. According to step 303 of the method 300 an abutting region, abutting the bounded region 503 is identified as abutting region 505.

Having now identified both regions, the method 300 may determine the thickness of the selection-deadband as per step 304. In the example of FIG. 5A, selection-deadband 506 is shown to have a thickness 507 and a height that is not the full height of either the bounded region 503 or the abutting region 505. The height of the selection-deadband 506 has been set in the example of FIG. 5A for illustration purposes. In practice, the height of the selection-deadband 506 may also be the full-height of the bounded-region 503, or the full-height of the abutting region 505, or a combination of either the full-height of the bounded-region 503, or the full-height of the abutting region 505. The height of the selection-deadband 506 may also be set according to other factors such as a constant scale, contour, or other user-assigned or system-assigned properties.

The thickness 507 of the selection-deadband 506 is determined according to the proximity of a boundary of the abutting region 505 and the boundary where the abutting occurs. In the example of FIG. 5A, the proximity of the abutting boundary and another boundary of the abutting region 505 is shown by the proximity distance 508. In other arrangements, a different boundary of the abutting region 505 may be used.

Having now determined the thickness 507 of the selection-deadband 506 as at step 304, the method 300 can now perform step 305 where the selection of items within the selection-deadband is disabled. In the example of FIG. 5A, the selection of items within the selection-deadband 506 is shown by the non-selected item 504 not being able to be selected.

Figure 5B:
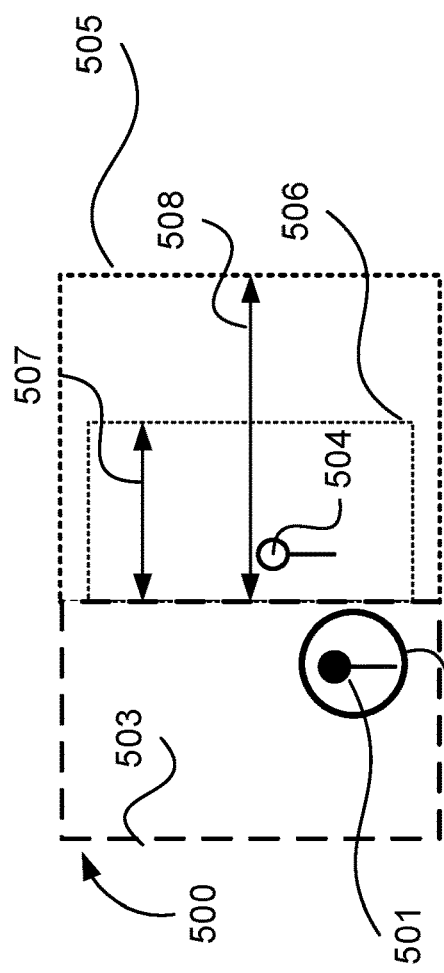
FIG. 5B shows the map of FIG. 5A where the cursor 502 is disabled from selecting non-selecting item.

FIG. 5B shows the map 500 where the cursor 502 is disabled (or disallowed) from selecting the non-selected item 504 as the item 504 lies within the selection-deadband 506; even though the cursor 502 is big enough to contain both the selected-item 501 and the non-selected item 504.

Figure 5C:
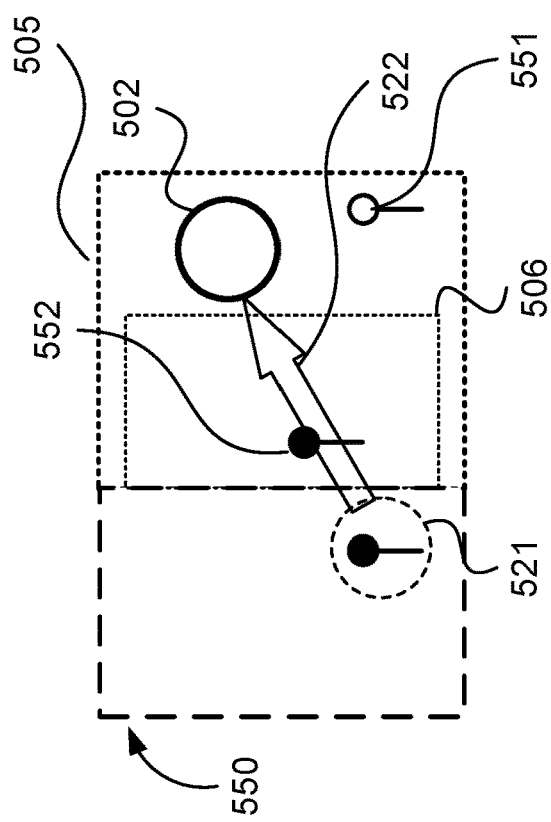
FIG. 5C shows the map of FIG. 5A where the cursor is within a selection-deadband.

Continuing the example of FIGS. 5A and 5B, FIG. 5C shows the cursor 502 within the selection-deadband 506. As at step 401 of the method 400, a check is performed to determine whether the cursor 502 is within the selection-deadband 506. In the example of FIG. 5C, the cursor 502 is currently placed wholly in the selection-deadband 506 after having travelled from an initial cursor location 521 via a vector 522. Consequently, the result of step 401 is a YES and thus the method 400 concludes without changing whether items in the selection-deadband 506 may be selectable and non-selected item 504 remains unselected.

Figure 5D:
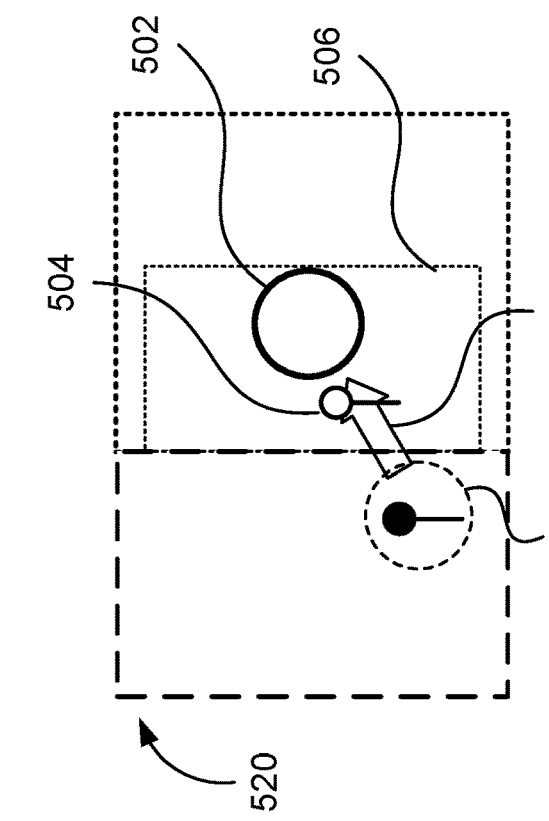
FIG. 5D show the map of FIG. 5A where the cursor is located outside of the selection-deadband and within the abutting region.

In contrast, FIG. 5D shows the cursor 502 located outside of the selection-deadband 506 and is contained within the abutting region 505 after having travelled from an initial cursor location 521 via a vector 522. As such, the check at step 401 produces a NO, and the method 400 proceeds to step 402. At step 402, as the cursor 502 is located outside of the selection-deadband 506, the method 400 produces a YES. Consequently, at step 403 the selection of items in the abutting region 505 are enabled. In the example of FIG. 5D, this means that the non-selected item 551 may be selected if the cursor 502 were to travel to the item 551. Then at step 404, the once-non-selected item 552 is selected since the item 552 was traversed by the vector 522 when the cursor 502 moved from the initial cursor location 521 to a current location 502 as seen in FIG. 5D.

Figure 6A:
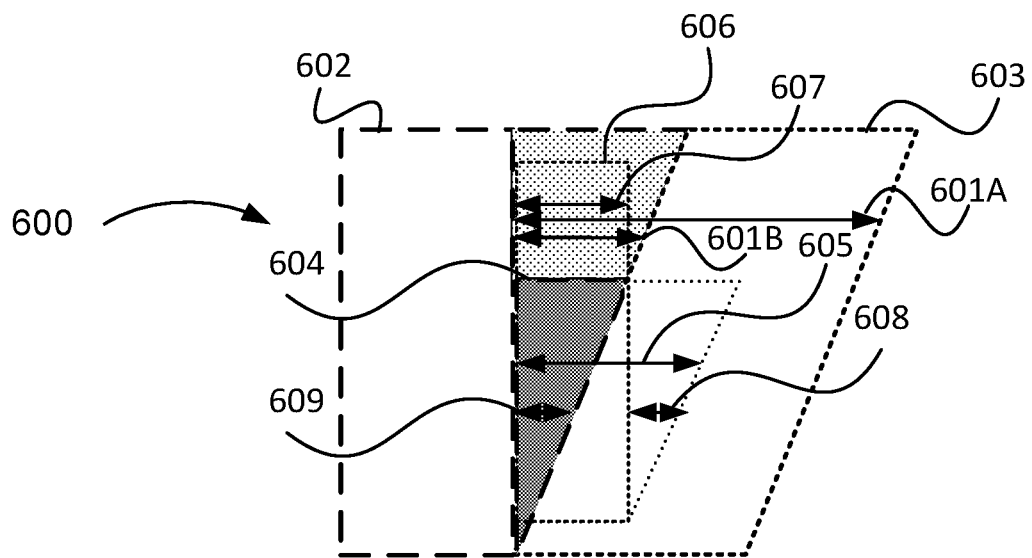
FIG. 6A shows two abutting regions two abutting regions that abut at one point.

FIG. 6A shows two abutting regions, in the form of an initial region 602 and an abutting region 603 that abut at one point and which are non-abutting otherwise. Selection-deadband 606 normally has a thickness 607. However, in the example of FIG. 6A, thickness of selection-deadband 606 changes at a point indicated by the line 604 where the thickness 607 is the same as the gap between the initial region 602 and the abutting region 603. Above the line 604, the thickness 607 is determined by considering the proximity from the abutting border and a boundary of the abutting region 603. For example, proximity distance 601A may be considered in determining the thickness 607 as at step 304 of the method 300. As another example, proximity distance 601B may be considered in determining the thickness 607 as at step 304 of the method 300. In determining the thickness 607, the method 300 may consider other aspects as well, such as a fixed maximum, or fixed minimum. Alternatively, the thickness 607 may be adjusted by a factor according to zoom/pixel density/cursor accuracy/user preferences or other properties of the user/application or environment. Below the line 604, the method 300 determines the thickness of the selection-deadband 606 differently. The method 300 may add an extra thickness proportional to gap distance 609, shown as an additional thickness 608 which when added to thickness 606 results in the thickness 605 applicable below the line 604. In some arrangements, the thickness 605 may be determined for every point between the line 604 and the abutting point between the two regions 602 and 603. In other arrangements, a mathematical description of the thickness 605 may be formed and applied as required instead.

Figure 6B:
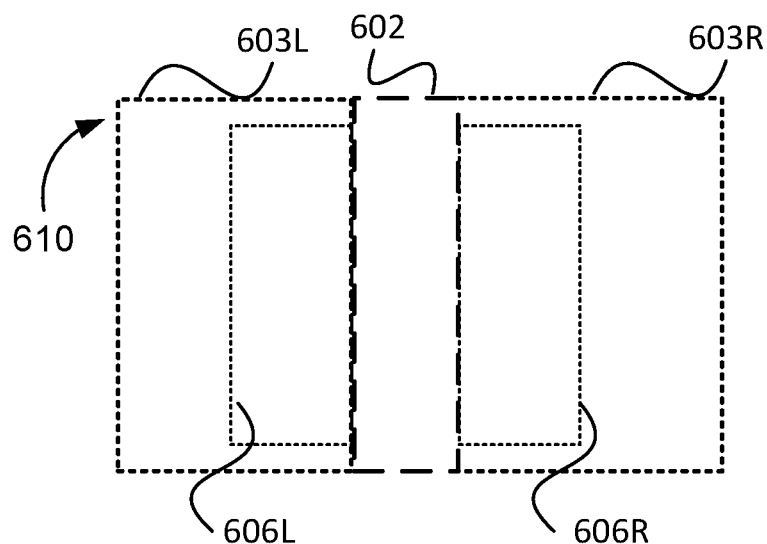
FIG. 6B shows three regions.

FIG. 6B shows an example where there are actually three regions 602, 603L and 603R. In FIG. 6B, there is the initial region 602 where the cursor and selection item are located (but not illustrated in FIG. 6B) and left abutting region 603L and the right abutting region 603R. In the example of FIG. 6B, two selection-deadbands are created in the form of selection-deadband 606L for the left abutting region 603L and selection-deadband 606R for the right abutting region 603R. The thickness for the two selection-deadbands 606R and 603R are determined as at step 304 of the method 300 as previously described.

FIG. 7A shows a map 700 comprising an initial region 701 with a cursor 702 located within the initial region 701. In FIG. 7A, the cursor 702 is near an internally-abutting region 703. According to the method 300 as described above, the selection-deadband 704 is shown in FIG. 7A. In the example of FIG. 7A, abutting boundary is considered to be boundary 705.

In the example of FIG. 7B, there is shown an initial region 711 with a cursor 702 located within the initial region 711 of a map 710. The initial region 711 has an externally-abutting region 712 surrounding the initial region 711. The abutting boundary between the two regions 711 and 712 is shown at boundary 714. Selection-deadband 713 is determined as at step 304 of the method 300 described above.

FIG. 7C shows an initial region 721 with the cursor 702 located within region 721 of a map 720. The initial region 721 has an abutting region 722. In contrast with previous examples described above, abutting region 722 has a non-rectangular contour. In the example of FIG. 7C, selection-deadband 723 may be shaped with a contour similar to abutting region 722. In other arrangements, the selection-deadband 723 may remain rectangular irrespective of the abutting region. Alternatively, in yet further arrangement the selection-deadband 723 may be irregularly shaped even if the contour of the abutting region is rectangular shaped.

FIG. 7D shows map 730 comprising an initial region 731 with an abutting region 732 having a height that is smaller than the initial region 731. In the example of FIG. 7D, a selection-deadband 733A may be determined in accordance with the method 300. In still another arrangement, selection-deadband 733B may be determined in accordance with the method 300. The difference between selection-deadband 733A and selection-deadband 733B is that selection-deadband 733A has a height dependent on abutting region 732 and that selection-deadband 733B has a height dependent on initial region 731. In other arrangements, a selection-deadband of a height dependent on both initial region 731 and abutting region 732 may be determined in accordance with the method 300.

FIG. 7E shows a map 740 comprising an initial region 741 with a top-abutting-region 742 and bottom abutting region 743. In accordance with the method 300, each abutting region is shown containing a selection-deadband. The top-abutting-region 742 has a selection-deadband 744 and the bottom-abutting-region 743 has a selection-deadband 745. In other arrangements, the two selection-deadbands 744 and 745 may be morphed into a combined selection-deadband 746.

FIG. 7F shows a map 750 comprising an initial region 741 with an L shaped abutting region 752. The abutting region 752 is an example of a shape that has a non-regular proximity distance between the abutting boundary and another boundary of the abutting region 752, similar to the example of FIG. 7C. However, in the example of FIG. 7F, the thickness of the abutting region 753 may be determined as at step 304 based on proximity distance 754A or 754B, or a combination of the two proximity distances 754A and 754B.

In still another arrangement, the selector used to operate a device implementing the method 300 may be a finger of a user. FIG. 8A shows a finger patch 805 of a diameter 804 in an initial region of a map 800 instead of a cursor in the initial region. In an abutting region of the map 800 is a selection-deadband 801 as shown in FIG. 8A. In the example of FIG. 8A, thickness 802 of the selection-deadband 801 is determined according to proximity distance 803 or diameter 804. In one arrangement, finger patch 805 may be used to determine thickness 802 for selection-deadband 801 for sections above line 804 by determining that the thickness 802 is to be the diameter 804. In another arrangement, finger patch 805 may be used to set the thickness 802 to be a factor of diameter 804 if proximity distance 803 is less than diameter 804. However, the thickness 802 may be a factor of proximity distance 803 if the proximity distance 803 is larger than the diameter 804.

In still another arrangement, thickness 802 may be determined in proportion to both the proximity distance 803 or diameter 804 in accordance to user settings, configurations, finger size of user, zoom level, device resolution, orientation, etc.

FIG. 8B shows a touch-surface 811 that is able to sense the tap of a finger by either detecting conductivity or by detecting pressure. Regardless of which method is used by the touch-surface 811, a finger will typically deform while pressing upon the touch-surface 811. Also shown in FIG. 8B, finger 812 has been tapped onto the touch-surface 811 very gently, and consequently a corresponding finger patch diameter 814 is very small. In contrast, finger 813 has been pressed harder on the touch-surface 811 and hence a corresponding finger patch diameter 815 is larger. In one arrangement, a finger patch diameter may be used to determine the thickness of a selection-deadband.

In another arrangement, the items on a map may contain orientation information. For example, if the items on maps represent the location of a photograph, the items may also contain compass bearing at the time the photograph was captured. For example, each item on the map may contain orientation information. FIG. 8C shows a map 820 comprising an initial region 825 and an abutting region 826. In the abutting region 826, an item 821 is shown that contains orientation information which is shown by orientation triangle 822. The orientation of the item 821 is oriented over the initial region 825. In the case where the item 821 is a photograph, the item 821 is a photograph of something located in the initial region 825. Consequently, thickness 824 of selection-deadband 823 will be adjusted to pretend that the item 821 is actually within the initial region 825. One example of such an adjustment of the selection-deadband 823 is shown in FIG. 8C where the selection-deadband 823 meets the item 821.

In another arrangement, two regions may not actually be abutting but instead be separated by a gap. Even though the two regions are non-abutting, a selection-deadband may still be formed by generalising the special case of the example of FIG. 6A above the point of abutment. FIG. 8D shows a map 830 comprising an initial region 831 separated by gap 834 from a secondary region 832. A selection-deadband 833 is drawn from a border between the initial region 831 and the gap 834. If the initial and secondary regions had been abutting, then the thickness of the selection-deadband 833 has thickness 836. However, since in the example of FIG. 8D there is a gap 834 between the initial region 831 and the secondary region 832, the thickness of the selection-deadband 833 has to be increased by an extension 835. Increasing the selection-deadband 833 by the extension 835 result in an actual thickness 838 for the selection-deadband 833. The determination of the extension 835 is based on the length of the gap 834. However, in other arrangements the extension 835 may be determined based the proximity distance 837 or a finger patch diameter. The thickness of the selection-deadband 833 may also be varied by the size of the gap 834. As the gap increases in size, then the selection-deadband 833 may decrease in size. Once the gap 834 is very large the selection-deadband 833 may no longer be required.

Figure 9B:
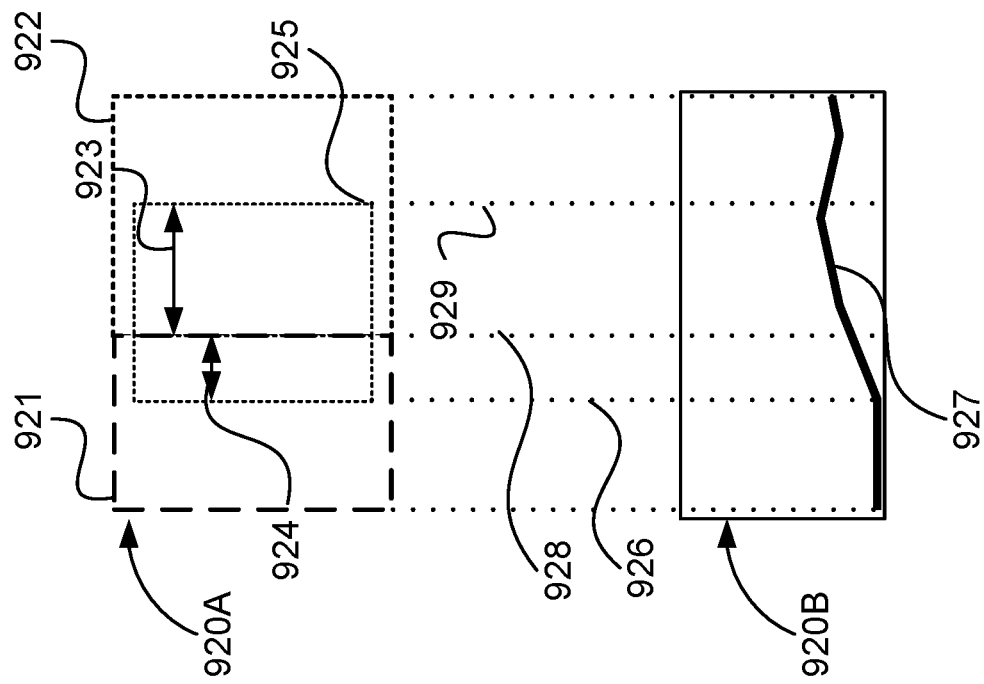
FIG. 9B shows an example where the selection-deadband changes its starting position to be within initial region according to a property of terrain.
Figure 9A:
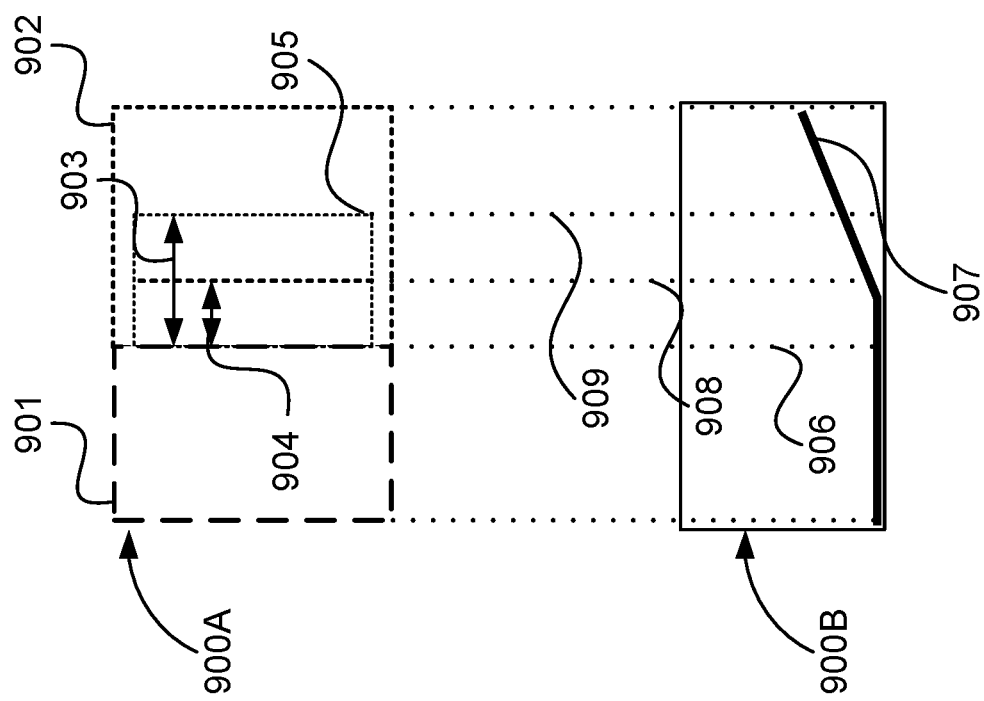
FIG. 9A shows a top-view and side-view where a selection-deadband thickness is adjusted according to terrain.

In an alternative arrangement, the corresponding selection-deadband may be adjusted according to geographical data, such as terrain information including but not limited to altitude data, rivers, cliffs, vegetation, infrastructure, etc. FIG. 9A shows a top-view 900A and side-view 900B. FIG. 9B shows a top-view 920A and side-view 920B.

Top-view 900A is a top-view of corresponding to side-view 900B. Likewise, top-view 920A is a top-view corresponding to a side-view 920B.

In the example of FIG. 9A, the top-view 900A and side-view 900B shows a selection-deadband 905 thickness 903 adjusted according to terrain 907 by modifying thickness of the selection-deadband 905 to new thickness 904.

Lines 906, 908, 909 are shown for aligning the abutting boundary between two regions, the far boundary of the selection-deadband 905 with the new thickness 904 and far boundary of the selection-deadband 905 with the thickness 903, respectively. In the side-view 900B, the terrain 907 is shown to have one property value (i.e., terrain incline) in a space corresponding to initial region 901 and a different property value starting some distance into the abutting region 902. In the example of FIG. 9A, the thickness 903 of the selection-deadband is adjusted by also considering the difference in contour properties. The thickness 903 is adjusted to be the new thickness 904 since the contour changes at the intersection with line 908. In other arrangements, the terrain property may refer to altitude, geographical formations, vegetation growth, vegetation variety, a road. In still other arrangements, the terrain property may refer to other infrastructure, human-made objects such as buildings, sheds and lighting, political boundaries or other artificial or naturally-occurring zones.

In FIG. 9B, the top-view 920A and side-view 920B show an example where the selection-deadband 925 changes its starting position to be within initial region 921 according to a property of terrain 927 that changes within the initial region 921 near the boundary between the initial region 921 and the abutting region 922. In the top-view 920A, the start of the selection-deadband 925 has moved a distance 924 into the initial region 921. Lines 926, 928, 929 are shown in FIG. 9B for aligning the far boundary of the distance 924, the boundary between the two regions, and the far boundary of the selection-deadband 925 in the abutting region 922. In the side-view 920, the terrain 927 is shown to have two values for a property in the space corresponding to the initial region 921, the property being the terrain incline. In the arrangement of FIG. 9B, the starting position of the selection-deadband 925 is adjusted by the distance 924 to begin at the line 926, thus aligning the start of the selection-deadband 925 to be when the value for the terrain 927 property changes. After having changed the starting position of the selection-deadband 925, the thickness 923 still represents the distance into the abutting region 922 that the selection-deadband 925 occupies, such that the actual total thickness of the selection-deadband 925 is actually the thickness 923 added to the distance 924. In other arrangements, the terrain property may refer to altitude, geographical formations, vegetation growth, vegetation variety, a road. In still another arrangement, the terrain property may refer to other infrastructure, human-made objects, political boundaries or other artificial or naturally-occurring zones.

In still another arrangement, the user may be able to vary the selection-deadband thickness by varying the speed at which the cursor moves when selecting items in an initial region. For example, with reference to FIG. 5C, the speed at which the cursor transitions from position 521 to position 502 affects the thickness of the selection-deadband 506. In some arrangements, an increase in speed results in an increase in thickness to compensate for the increased chance of errors in selecting items near the boundary between the two regions. Similarly, a decrease in speed indicates a finer control of movement and thus the thickness may be reduced as the chance of selection errors is reduced.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. A method of selecting items in a graphical user interface displayed on a screen, the method comprising:
   detecting a selection of at least one item in the graphical user interface, the at least one item being located in a bounded region of the graphical user interface, the bounded region having an abutting region;
   setting, in the abutting region, a selection deadband representing a distance from a boundary between the bounded region and the abutting region, the selection deadband having a thickness determined according to proximity of another boundary of the abutting region; and
   disabling selection of an item located in the abutting region until a selector is traversed past the selection deadband and into the abutting region.

2. The method according to claim 1, further comprising:
   determining an orientation of a camera located near the boundary between the initial region and the abutting region; and
   modifying the selection deadband according to the determined orientation of the camera.

3. The method according to claim 1, further comprising modifying the selection deadband according to a constant scale.

4. The method according to claim 1, further comprising modifying the selection deadband according to contour.

5. The method according to claim 1, wherein a thickness of the selection deadband is adjusted according to a zoom factor.

6. The method according to claim 1, wherein a thickness of the selection deadband is adjusted according to pixel density.

7. The method according to claim 1, wherein a thickness of the selection deadband is adjusted according to accuracy of the selector.

8. The method according to claim 1, modifying a shape of the selection deadband according to a shape of the abutting region.

9. The method according to claim 1, wherein two selection deadbands are morphed to form the selection deadband.

10. The method according to claim 1, wherein the selector is a cursor.

11. The method according to claim 1, further comprising:
    determining a finger patch upon detecting a finger press; and
    modifying the selection deadband according to the determined finger patch.

12. An apparatus for selecting items in a graphical user interface displayed on a screen, the apparatus comprising:
    means for detecting a selection of at least one item in the graphical user interface, the at least one item being located in a bounded region of the graphical user interface, the bounded region having an abutting region;
    means for setting, in the abutting region, a selection deadband representing a distance from a boundary between the bounded region and the abutting region, the selection deadband having a thickness determined according to proximity of another boundary of the abutting region; and
    means for disabling selection of an item located in the abutting region until a selector is traversed past the selection deadband and into the abutting region.

13. A system for selecting items in a graphical user interface displayed on a screen, the system comprising:
    a memory for storing data and a computer program;
    a processor coupled to the memory for executing the computer program, the computer program having instructions for:
       detecting a selection of at least one item in the graphical user interface, the at least one item being located in a bounded region of the graphical user interface, the bounded region having an abutting region;
       setting, in the abutting region, a selection deadband representing a distance from a boundary between the bounded region and the abutting region, the selection deadband having a thickness determined according to proximity of another boundary of the abutting region; and
       disabling selection of an item located in the abutting region until a selector is traversed past the selection deadband and into the abutting region.

14. A non-transitory computer readable medium having a program stored on the medium for selecting items in a graphical user interface displayed on a screen, the program comprising:
    code for detecting a selection of at least one item in the graphical user interface, the at least one item being located in a bounded region of the graphical user interface, the bounded region having an abutting region;
    code for setting, in the abutting region, a selection deadband representing a distance from a boundary between the bounded region and the abutting region, the selection deadband having a thickness determined according to proximity of another boundary of the abutting region; and
    code for disabling selection of an item located in the abutting region until a selector is traversed past the selection deadband and into the abutting region.

* * * * *